United States Patent [19]
Akasaki et al.

[11] Patent Number: 6,090,897
[45] Date of Patent: Jul. 18, 2000

[54] CURABLE RESIN COMPOSITION AND ITS USE

[75] Inventors: Ichimoto Akasaki, Nishinomiya; Koichiro Saeki, Suita, both of Japan

[73] Assignee: Nippon Shokubai Co., Ltd., Osaka, Japan

[21] Appl. No.: 08/986,680

[22] Filed: Dec. 8, 1997

[30] Foreign Application Priority Data

Dec. 9, 1996 [JP] Japan ..................... 8-328877
Feb. 19, 1997 [JP] Japan ..................... 9-035063

[51] Int. Cl.$^7$ .............. C08F 20/00; C08F 8/00; C08F 8/30; C08F 283/00
[52] U.S. Cl. ............ 525/440; 525/132; 525/145; 525/517; 525/329.9; 548/225
[58] Field of Search ............... 525/132, 145, 525/440, 517, 329.9; 524/517; 548/225

[56] References Cited

U.S. PATENT DOCUMENTS

| | | |
|---|---|---|
| 3,023,126 | 2/1962 | Underwood et al. . |
| 4,214,039 | 7/1980 | Steiner et al. . |
| 4,474,923 | 10/1984 | Keskey et al. . |
| 4,508,869 | 4/1985 | Keskey et al. . |
| 4,525,521 | 6/1985 | DenHartog et al. ............ 524/517 |
| 4,609,692 | 9/1986 | Huybrechts et al. ............ 523/439 |
| 4,929,675 | 5/1990 | Abe et al. ............ 525/66 |
| 5,073,620 | 12/1991 | Sanada et al. ............ 525/68 |
| 5,175,211 | 12/1992 | Sanada et al. ............ 525/66 |
| 5,182,336 | 1/1993 | Abe et al. ............ 525/132 |
| 5,446,099 | 8/1995 | Yoshida et al. . |
| 5,587,427 | 12/1996 | Abe et al. ............ 525/145 |

FOREIGN PATENT DOCUMENTS

| | | |
|---|---|---|
| 63-48884 | 10/1988 | Japan . |
| 5-032890 | 2/1993 | Japan . |
| 06220395 | 8/1994 | Japan . |
| 7-118548 | 5/1995 | Japan . |
| 08291263A | 11/1996 | Japan . |
| 10316954A | 12/1998 | Japan . |
| 9511274 | 10/1994 | WIPO . |

OTHER PUBLICATIONS

Olabasi, O "Handbook of Thermoplastics" Marcel Dekker, Inc, 1–st edition, pp. 19,20,31,434–435, 659–660.

*Primary Examiner*—David W. Wu
*Assistant Examiner*—Tanya Zalukaeva

[57] ABSTRACT

The present invention provides a curable resin composition and its application to laminate film, which can form a coating film having excellent performances such as adhesion to various substrates at a low temperature of 150° C. or lower, water resistance and chemical resistance, can be suitably used for various purposes of use, and can be used safely. The curable resin composition comprises a carboxyl group-containing polymer and an oxazoline group-containing polymer, and is characterized in that the carboxyl group-containing polymer contains primary and/or secondary amino groups.

17 Claims, No Drawings

CURABLE RESIN COMPOSITION AND ITS USE

BACKGROUND OF THE INVENTION

A. Technical Field

The present invention relates to a curable resin composition which is suitably used for various purposes of use, for example, paints, surface treating agents (such as primers and anchoring agents), adhesives, pressure-sensitive adhesives, printing inks, and more particularly, to a curable resin composition which can form a coating film having excellent adhesion to various substrates.

Also, the present invention relates to a laminate film useful as, for example, films for packaging, and to a curable adhesive composition used for an adhesive layer of the laminate film. More specifically, it relates to a laminate film in which a film of thermoplastic resins, for example, polyolefin (such as polypropylene and polyethylene), polyamide, polyester, vinylidene chloride polymer, ethylene vinyl alcohol copolymer, cellophane, is laminated, or a laminate film in which a film of a thermoplastic resin, for example, polyolefin (such as polypropylene and polyethylene), polyamide, polyester, vinyl chloride, cellophane, which can impart strength at relatively low cost, is used as a substrate, and a layer of, for example, vinylidene chloride polymer, ethylene vinyl alcohol copolymer, which imparts a barrier property against moisture or oxygen, is laminated thereon, and to a curable adhesive composition which is used for an adhesive layer of those laminate films.

B. Background Art

Two-liquid type curable resin compositions comprising an oxazoline group-containing polymer and a carboxyl group-containing polymer have been so far investigated Japanese Allowable Patent Publication (Kokoku) No. Showa 63-48884, hereinafter referred to as "JP-B"). Further, methods of beforehand neutralizing carboxyl groups in a carboxyl group-containing polymer with a basic component are also investigated in order to increase stability of a one-liquid type curable resin composition comprising an oxazoline group-containing polymer and a carboxyl group-containing polymer (Japanese Patent Application Publication (Kokai) No. Heisei 7-118548, herein after referred to as "JP-A"). Such curable resin compositions comprising an oxazoline group-containing polymer and a carboxyl group-containing polymer can form a coating film, having excellent performances such as water resistance and chemical resistance, by crosslinking reactions.

However, the above-mentioned conventional curable resin composition comprising an oxazoline group-containing polymer and a carboxyl group-containing polymer are still not sufficient in adhesion to various substrates. For example, JP-A-7-118548 exemplifies dimethylaminoethyl (meth)acrylate as a copolymerizable composition in the copolymer of the oxazoline group-containing polymer and carboxyl group-containing polymer, but adhesion is insufficient with such tertiary amino group- or amido group-containing unsaturated monomers. Further, JP-B-63-48884 exemplifies amino group-containing unsaturated monomers as a co-reactive unsaturated monomers. However, high temperature treatment at 200° C. or more is necessary for the reaction between an amino group and an oxazoline group in order to increase performances of the coating film, such as water resistance and chemical resistance. Therefore, the purposes of use are limited.

On the other hand, primary and secondary amino group-containing polymers represented by polyethyleneimine or the like have good adhesion to various substrates due to the primary and secondary amino groups, and therefore, those polymers are used in wide fields as a primer or the like. Furthermore, where the primary and secondary amino group-containing polymers and primary amino group-containing compounds represented by polyamide amine or the like are used as a paint and an adhesive, it is also investigated to use them as a curable resin composition by mixing a crosslinking agent such as an epoxy compound, in order to increase performances of the coating film, such as water resistance and chemical resistance.

However, the primary and secondary amino group-containing polymers have excellent adhesion to various substrates, but are insufficient in performances of coating film, such as water resistance and chemical resistance. If the crosslinking agent such as the epoxy compound is used in order to avoid this, it suffers problems, on working, of safety such as skin irritation due to the epoxy resin.

On the other hand, in the field of laminate films as a use of the above-mentioned conventional curable adhesive composition, there are the following problems:

That is to say, a laminate film in which a film of thermoplastic resins, for example, polyolefin (such as polypropylene and polyethylene), polyamide, polyester, vinylidene chloride polymer, ethylene vinyl alcohol copolymer, cellophane, is laminated, or a laminate film in which a film of a thermoplastic resin, for example, polyolefin (such as polypropylene and polyethylene), polyamide, polyester, vinyl chloride, cellophane, or the like, which can impart strength at relatively low cost, is used as a substrate, and a layer of, for example, vinylidene chloride polymer, ethylene vinyl alcohol polymer, which imparts a barrier property against moisture or oxygen, is laminated thereon, exhibits functions such as moisture-proof property, and gas barrier property, and are therefore widely used as, for example, packaging films for foods.

In those laminate films, in order to improve interlayer adhesive property and water resistance, it has been practiced at the initial stage to improve surface adhesive property by applying corona discharge treatment, flame treatment, or chemical treatment with alkalis or acids to the surface of the thermoplastic resin film. However, in recent years, in order to meet further demanded performance, it is investigated to provide a layer of an adhesive composition as an adhesive for laminating films on each other in a laminate film, or provide an adhesive composition layer as a primer where a resin layer of vinylidene chloride polymer is coated on a thermoplastic resin film. For example, U.S. Pat. No. 3,023,126 proposes to use a polyurethane primer, and U.S. Pat. No. 4,214,039 proposes to use an aqueous curable primer of acid-neutralized amino group-containing polymer and epoxy resin.

Further, it is already stated about an application of the oxazoline group-containing compound or the primary and secondary amino group-containing polymers.

However, such adhesive compositions, as conventionally proposed, had problems in that: the composition is difficult to handle due to its sensitivity to moisture; the pot life is short and therefore causes problems on workability; and the discoloration occurs during hot water immersion. That is to say, the polyurethane composition, as proposed in U.S. Pat. No. 3,023,126, is sensitive to moisture and therefore difficult to handle. Further, the composition, as proposed in U.S. Pat. No. 4,214,039, is a composition which is an aqueous system comprising acid-neutralized amino group-containing polymer and epoxy resin, and imparts curable adhesive property, so that the pot life after mixing is short, and further, the discoloration occurs during hot water immersion, and thus there is room for further improvement.

Further, even if the curable composition comprising an oxazoline group-containing polymer and a carboxyl group-containing polymer, as disclosed in JP-B-63-48884, is applied to a laminate film, it is insufficient in respect to the adhesion. Furthermore, where the curable composition comprising primary and secondary amino group-containing polymers, as represented by polyethyleneimine, and an epoxy resin is applied to a laminate film, a pot life is produced, and the workability is poor.

SUMMARY OF THE INVENTION

A. Objects of the Invention

A first object of the present invention is to provide a curable resin composition which can form a coating film at a low temperature of 150° C. or lower excellent in the adhesion to various substrates, and in performances such as water resistance and chemical resistance, and can suitably be used for various purposes of use, and can be used safely.

A second object of the present invention is to provide a curable adhesive-composition having a long pot life, excellent water resistance and hot water resistance, and also excellent adhesion, and a laminate film using this composition.

B. Disclosure of the Invention

To attain the first object, a curable resin composition of the present invention comprises a carboxyl group-containing polymer and an oxazoline group-containing polymer, characterized in that the carboxyl group-containing polymer contains primary and/or secondary amino groups.

In the present invention, since the carboxyl group has a higher reactivity to the oxazoline group than the amino group does, even if the carboxyl group-containing polymer and the oxazoline group-containing polymer are mixed, large portion of the amino groups is not consumed for the reaction with the oxazoline group. In particular, this is remarkable at a low temperature of 150° C. or lower. Therefore, the amino groups are present in the coating film, so that the adhesion of the coating film is greatly improved. Furthermore, this does not give bad influence to the good water resistance and chemical resistance, which are inherently possessed by the curable resin composition containing a carboxyl group-containing polymer and an oxazoline group-containing polymer.

The curable resin composition in the present invention means not only final products, but also intermediate products which do not contain various additives to be added according to the necessity.

In the curable resin composition in the present invention, it is preferred that the primary and/or secondary amino groups are represented by the following general formula (I):

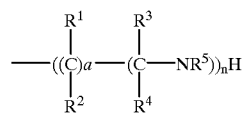

(I)

(wherein $R^1$, $R^2$, $R^3$, $R^4$ and $R^5$ each represent hydrogen, halogen, alkyl, aralkyl, aryl group, or cyano-, halo- amino-, hydroxy-, alkoxy- or carboalkoxy-substituted alkyl, aralkyl or aryl group, a is 0 or 1, and n is 1 or more). Further, it is preferred that the carboxyl group-containing polymer containing the primary and/or secondary amino groups is one obtained by modifying a part of carboxyl group of the carboxyl group-containing polymer into primary and/or secondary amino groups with alkyleneimine.

It is preferred that the curable resin composition of the present invention further comprises a basic compound.

To attain the second object, the present invention provides:

a curable adhesive composition which is used as an adhesive layer of a laminate film in which a first thermoplastic resin layer and a second thermoplastic resin layer are laminated through the adhesive layer, characterized in that the composition contains a polymer having primary and/or secondary amino groups and carboxyl group in one molecule and a polyvalent oxazoline compound; and a curable adhesive composition which is used as an adhesive layer of a laminate in which a functional layer comprising a thermoplastic resin layer having barrier property against moisture and/or oxygen is laminated on a substrate layer comprising a thermoplastic resin layer through the adhesive layer, characterized in that the composition contains a polymer containing primary and/or secondary amino groups and carboxyl group in one molecule and a polyvalent oxazoline compound.

Further, the present invention provides:

a laminate film in which a first thermoplastic resin layer and a second thermoplastic resin layer are laminated through an adhesive layer, characterized in that a curable adhesive composition containing a polymer having primary and/or secondary amino groups and carboxyl group in one molecule, and a polyvalent oxazoline compound, is used as the adhesive layer; and a laminate film in which a functional layer comprising a thermoplastic resin layer having barrier property against moisture and/or oxygen is laminated on a substrate layer comprising a thermoplastic resin layer through the adhesive layer, characterized in that a curable adhesive composition containing a polymer having primary and/or secondary amino groups and carboxyl group in one molecule and a polyvalent oxazoline compound, is used as the adhesive layer.

Further, the present invention also provides the above-mentioned curable adhesive composition, wherein the first thermoplastic resin layer and/or the second thermoplastic resin layer are polyolefin film, polyamide film or polyester film, and the above-mentioned curable adhesive composition, wherein the thermoplastic resin layer as the functional layer is a vinylidene chloride polymer layer.

In the present invention, since the oxazoline group has a higher reactivity to the carboxyl group than to the amino group, even if the polymer having a carboxyl group and primary and/or secondary amino groups is mixed with the polyvalent oxazoline compound, most of the amino groups are not consumed for the reaction with the oxazoline group. In particular, this tendency is remarkable under dry curing conditions at a temperature of 150° C. or lower. Therefore, the amino groups are present in the adhesive layer, so that the adhesion between the thermoplastic resin layers is greatly enhanced. Furthermore, the carboxyl group and the oxazoline group react with each other to form a crosslinked structure. As a result, the water resistance can be imparted, hot water resistance is excellent, and at this time, any discoloration does not occur. Furthermore, a mixture of the polymer having primary and/or secondary amino groups and carboxyl group in one molecule and a compound having at least two oxazoline groups per molecule, which forms the above-mentioned adhesive layer, has a long pot life and is also excellent with regard to the workability.

These and other objects and advantages of the present invention will be more fully apparent from the following detailed disclosure.

DETAILED DESCRIPTION OF THE INVENTION

Explanation of Curable Resin Composition

The polymer containing carboxyl group and primary and/or secondary amino groups (hereinafter sometimes referred to as "polymer (A)") has carboxyl group and primary and/or secondary amino groups in one molecule of the polymer. Examples of the primary and/or secondary amino groups include groups represented by the following general formula (I):

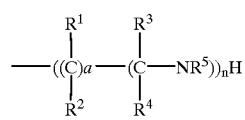

(wherein $R^1$, $R^2$, $R^3$, $R^4$ and $R^5$ each represent hydrogen, halogen, alkyl, aralkyl, aryl group, or cyano-, halo- amino-, hydroxy-, alkoxy- or carboalkoxy-substituted alkyl, aralkyl or aryl group, a is 0 or 1, and n is 1 or more).

Examples of methods of obtaining such a polymer (A) include: a method of modifying a part of carboxyl groups of the carboxyl group-containing polymer (A-1) into primary and/or secondary amino groups; a method of modifying glycidyl groups of carboxyl group and glycidyl group-containing polymer, polymerized by using unsaturated carboxylic acid and glycidyl (meth)acrylate, into primary and/or secondary amino groups with an amine compound such as ammonia, a method of polymerizing using modified unsaturated glycidyl group-containing monomer such as glycidyl (meth)acrylate with an amine compound such as ammonia, primary and/or secondary amino group-containing monomer such as allyl amine and aminoethyl (meth)acrylate, and unsaturated carboxylic acid. Among them, the method of modifying a part of carboxyl groups of carboxyl group-containing polymer (A-1) into primary and/or secondary amino groups is most preferred.

The carboxyl group-containing polymer (A-1) is obtained by polymerizing a monomer component (a) containing at least one kind of unsaturated carboxylic acids (a-1).

Examples of the unsaturated carboxylic acid (a-1) include the following: unsaturated monocarboxylic acids such as (meth)acrylic acid, cinnamic acid, and crotonic acid; unsaturated dicarboxylic adds such as maleic acid, itaconic acid, and fumaric acid, or monoesters thereof. One kind or a mixture of two kinds or more selected from those groups can be used.

The content of the unsaturated carboxylic acid (a-1) is not particularly limited, but is preferably 2% by weight or more of the polymer (A-1).

The monomer component (a) can use, if necessary, in addition to the unsaturated carboxylic acid (a-1), unsaturated monomer (a-2) which is copolymerizable with the unsaturated carboxylic acid (a-1), and does not react with carboxyl group. Examples of the unsaturated monomer (a-2) include the following: (meth)acrylic esters such as methyl (meth)acrylate, butyl (meth)acrylate, and 2-ethylhexyl (meth)acrylate; unsaturated nitriles such as (meth)acrylonitrile; unsaturated amides such as (meth)acrylamide and N-methylol (meth)acrylamide; vinyl esters such as vinyl acetate and vinyl propionate; vinyl ethers such as methyl vinyl ether and ethyl vinyl ether; α-olefins such as ethylene and propylene; halogenated α, β-unsaturated monomers such as vinyl chloride, vinylidene chloride, and vinyl fluoride; α, β-unsaturated aromatic monomers such as styrene and α-methylstyrene. Those can be used alone or as mixture of two or more kinds thereof.

The polymer (A-1) is obtained by that a monomer component (a) is polymerized by conventionally known methods such as solution polymerization, emulsion polymerization and suspension polymerization. If necessary, the degree of polymerization may be controlled using a chain transfer agent such as a mercaptan compound.

The polymer (A-1) is not particularly limited so long as it has a carboxyl group. Solvent-soluble, non-aqueous dispersible, water-soluble, water-diluting and water-dispersible resins such as polyester resins, polyurethane resins, and polyolefin resins are exemplified. Those can be used alone or as mixtures of two or more kinds thereof.

Examples of the method of modifying carboxyl group in the polymer (A-1) into amino group include the following: a method of using alkyleneimine (a-3), a method of using a polyamine such as polyoxyalkylene polyamine. The method of using alkyleneimine (a-3) is preferable.

The alkyleneimine (a-3) is represented by the following general formula (II):

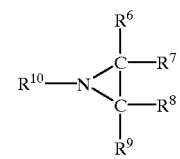

(wherein $R^6$, $R^7$, $R^8$, $R^9$ and $R^{10}$ each represent hydrogen, halogen, alkyl, aralkyl, aryl group, or cyano-, halo-, amino-, hydroxy-, alkoxy-, or carboalkoxy-substituted alkyl or aryl group).

Specific examples of the alkyleneimine include ethylene imine, 1,2-propyleneimine, 1,2-dodecyleneimine, 1,1-dimethylethyleneimine, phenylethyleneimine, benzylethyleneimine, hydroxyethylethyleneimine, aminoethylethyleneimine, 2-methylpropyleneimine, 3-chloropropyleneimine, methoxyethylethyleneimine, dodecylazilidinyl formate, N-ethylethyleneimine, N-(2-aminoethyl)ethyleneimine, N-(phenethyl)ethyleneimine, N-(2-hydroxyethyl)ethyleneimine, N-(cyanoethyl) ethyleneimine, N-phenylethyleneimine, N-(p-chlorophenyl) ethyleneimine. One kind or a mixture of two kinds or more selected from those groups can be used. Of those, ethylene imine and 1,2-propylene imine are industrially easily available and are suitable.

If the carboxyl group is modified with alkyleneimine, a group wherein primary and/or secondary amino groups are bonded to —COO— group, that is, a group represented by the following formula, is obtained.

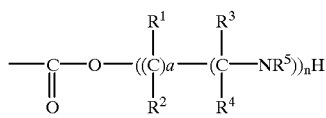

(wherein $R^1$, $R^2$, $R^3$, $R^4$, $R^5$, a, and n are the same as those in the general formula (I)).

Theoretically, n is 1 or more. However, in the reaction of carboxyl group and alkyleneimine, a product is obtained, which has a distribution including ones wherein one molecule of alkylene imine is reacted with one carboxyl groups, and two or more alkyleneimines are reacted with one carboxyl group, irrespective of the ratio of carboxyl group and alkyleneimine in the reaction. Therefore, n exceeds 1 on the average.

The carboxyl group modified with alkyleneimine is preferably 1 to 10% by weight as the amount of unsaturated carboxylic acid (a-1) in the polymer (A-1). For the reaction with oxazoline group in the polymer (B), it is preferable to retain the carboxyl group in an amount of 1% by weight or more as the amount of the unsaturated carboxylic acid (a-1) in the polymer (A-1). Where the carboxyl group modified with alkyleneimine is less than 1% by weight as the amount of the unsaturated carboxylic acid (a-1) in the polymer (A-1), adhesion of the coating film formed is decreased, which is not preferable. Where the amount exceeds 10% by weight, performances of the coating film formed, such as water resistance, are decreased, which is not preferable. If the amount of the unsaturated carboxylic acid in unmodified polymer (A-1) is less than 1% by weight, such an amount is not substantially effective amount in the reaction with the polymer (B), and the performances of the coating film formed, such as water resistance, are decreased, which is not preferable.

As to the polymer (A) having carboxyl group and primary and/or secondary amino groups in the present invention, examples of the method of obtaining the polymer (A) wherein n=1 in the general formula (I) include a method of using amino group-containing unsaturated monomer such as allylamine or aminoethyl (meth)acrylate. However, the allylamine has low polymerizability with other unsaturated monomers, and it is therefore difficult to obtain the polymer (A) suitable for various purposes of use. Further, aminoethyl (meth)acrylate is an unstable monomer, and specific consideration is needed for the use thereof. However, the above-mentioned method of modifying carboxyl group of the carboxyl group-containing polymer (A-1) into amino group with the alkyleneimine does not have the above-mentioned problem, and is an excellent method which can easily provide the polymer (A) having carboxyl group and primary and/or secondary amino groups.

The carboxyl group in the polymer (A) has high reactivity with oxazoline group. Therefore, in order to suitably using as a one-liquid type or to prolong a pot life even if it is two-liquid type, it is preferred to neutralize the carboxylic acid with a basic compound.

Examples of the basic compound include the following ammonia; primary amines such as methylamine; secondary amines such as dimethylamine; tertiary amines such as triethylamine; aliphatic amines such as dimethyl ethanolamine, n-butylamine, and diethylamine; alicyclic amines such as cyclohexylamine; heterocyclic amines such as piperidine, morpholine, N-ethylpiperidine, N-ethylmorpholine, and pyridine; aromatic amines such as benzylamine, N-methylaniline, and N,N-dimethylaniline; tetraalkylammonium halides such as tetramethylammonium chloride and tetraethylammonium chloride; tetraalkylammonium organic acid salts such as tetramethylammonium acetate; tetraalkylammonium inorganic acid salts such as tetramethylammonium hydrogen sulfate and tetraethylammonium hydrogen sulfate; (hydroxy)alkylammonium hydroxides such as tetramethylammonium hydroxide, tetraethylammonium hydroxide, or monohydroxyethyltrimethylammonium hydroxide; hydroxides of alkali metals such as sodium and potassium; hydroxides of transition metals such as barium, strontium, calcium, and lanthanum; free salts of complex salts such as $[Pt(NH_3)_6]OH_4$. One kind of those or mixtures of two or more thereof can be used.

It is preferred that the above-mentioned basic compound is used in an amount of 0.1 to 3 times (more preferably 0.3 to 3 times) the theoretical equivalent weight as needed to neutralize carboxyl groups in the polymer (A). Where the amount of the basic compound is less than 0.1 time the theoretical neutralization amount, the stability in the one-liquid type is decreased due to unneutralized carboxyl groups. Where it exceeds 3 times, crosslinking reactivity and performances of the coating film are decreased, which is not preferable.

Incidentally, conducting neutralization is not limited to the stage of the polymer (A), but neutralization may be conducted at the stage of the polymer (A-1), followed by modifying into amino group, thereby obtaining the polymer (A-1).

Examples of the oxazoline group-containing polymer (hereinafter sometimes referred to as "polymer (B)") include those which are obtained by polymerizing a monomer component (b) comprising, as the essential component, an unsaturated oxazoline (b-1) represented by the following general formula (III):

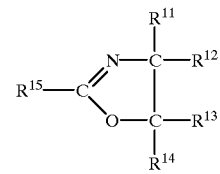

(wherein $R^{11}$, $R^{12}$, $R^{13}$ and $R^{14}$ each represent hydrogen, halogen, alkyl, aralkyl, aryl, or substituted aryl group, and $R^{15}$ is an acyclic organic group having an unsaturated bond).

Examples of the unsaturated oxazoline (b-1) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline. One kind or a mixture of two kinds or more selected from those groups can be used. Of those, 2-isopropenyl-2-oxazoline is industrially easily available, and is preferable.

The content of the unsaturated oxazoline (b-1) is not particularly limited, but 5% by weight or more in the polymer (B) is preferred. Where the content is less than 5% by weight, the performances of the coating films formed, such as water resistance, are decreased, which is not preferable.

The monomer component (b) can use, if necessary, in addition to the unsaturated oxazoline (b-1), an unsaturated monomer which is copolymerizable with the unsaturated oxazoline (b-1) and does not react with oxazoline group, and the same compounds as in the above-mentioned unsaturated monomer (a-2) can be used. Those unsaturated monomers can be used alone or as mixtures of two or more thereof.

The polymer (B) is obtained by polymerizing the monomer component (b) by the same conventional polymerization methods as of the polymer (A-1). If necessary, the degree of polymerization may be controlled using a chain transfer agent such as a mercaptan compound, which is also the same as the case of the polymer (A-1).

The curable resin composition of the present invention contains the above-mentioned polymer (A) having carboxyl group and primary and/or secondary amino groups, and oxazoline group-containing polymer (B). The mixing proportion of the polymers (A) and (B) is not particularly limited. However, in order to form a coating film having excellent adhesion to various substrates, water resistance, and chemical resistance, it is preferred to mix them such that the oxazoline group in the polymer (B) is 0.1–3.0 equivalents, more preferably 0.3–2.0 equivalents, of the carboxyl group equivalent in the polymer (A). Where it is less than 0.1 equivalent, the reaction is not sufficient, so that performances of the coating film formed, such as water resistance, are decreased, which is not preferable, and where it exceeds 3.0 equivalents, due to increase of the unreacted polymer (B), the performances of the coating film formed such as water resistance are decreased similarly, which is not preferable. Incidentally, the "carboxyl group in the polymer (A)" as referred to herein includes carboxyl groups neutralized with the basic compound.

The curable resin composition of the present invention is obtained by mixing the basic compound, and if necessary, other additives, with the above-mentioned polymer (A) and (B), but the mixing method and mixing order are not particularly limited. In order to further increase the stability in one-liquid type, it is preferred to add the polymer (B) to a mixture of the polymer (A) and the basic compound and to then mix them.

The curable resin composition of the present invention may use additives, if necessary, such as filler, pigment, pigment dispersant, plasticizer, antioxidant, ultraviolet absorbing agent, fluidity adjuster or surface-active agent.

The curable resin composition of the present invention may be used in the form of either one- or two-liquid type.

The curable resin composition of the present invention can suitably be used for various purposes of use, for example, paints, surface treating agents (such as primers and anchoring agents), adhesives, pressure-sensitive adhesives, printing inks, by appropriately selecting the kind and amount of the monomer component (a), alkyleneimine (a-3), basic compound, and monomer and compound in the monomer component (b), which are used in preparation of the polymers (A) and (B).

A method of using the curable resin composition of the present invention may be the one according to the conventional method, and the composition is coated on a substrate such as a film, dried at a predetermined temperature and heat cured to form a coating film. In heat curing, it can be heat cured at a temperature of 150° C. or lower to form a coating film. The coating film obtained has excellent adhesion to various substrates. The various substrates are not particularly limited, but examples thereof are as follows: organic substrates such as polypropylene, PET, polystyrene, and wood; and inorganic substrates such as metals (e.g. iron, aluminum, copper) and glass. In addition, good adhesion is also obtained to surfaces of molded matters which, for example, comprise polystyrene, particularly, modified polystyrene as obtained by partially modifying the polystyrene with maleimide-styrene copolymers to provide properties such as heat resistance.

Explanation of Laminate Film

The laminate film according to the present invention is such that 1) the first thermoplastic resin layer and the second thermoplastic resin layer are laminated through the adhesive layer, or 2) the functional layer comprising the thermoplastic resin layer having barrier property against moisture and/or oxygen is laminated on the substrate layer comprising the thermoplastic resin layer through the adhesive layer.

The above-mentioned laminate film 1) is largely classified into two types. One is a type (type 1) that one thermoplastic resin layer has a relatively large thickness and plays a role as the substrate layer, and another thermoplastic resin layer has a relatively small thickness and plays a role as the functional layer that imparts a function to the substrate layer. Another is a type (type 2) that there is no main-sub relationship between two thermoplastic resin layers as mentioned above. The above-mentioned laminate 2) is exemplified as one embodiment of the type 1.

As the substrate layer of type 1, one that can impart strength at a relatively low cost is preferred, and films of polyolefin (such as polypropylene and polyethylene), polyamide, polyester, polyvinyl chloride, polystyrene, modified polystyrene (such as polyphenylmaleimide-modffied styrene), and cellophane are exemplified. Further, films comprising those mixtures, films obtained by copolymerizing those, and films obtained by laminating those may be used. The film may be stretched. The thickness of the substrate layer of type 1 is about 1–300 $\mu$m, and preferably about 5–100 $\mu$m.

As the functional layer of type 1, functional layers comprising a thermoplastic resin layer having a barrier property against moisture and/or oxygen of the above-mentioned laminate film 2) are exemplified. Examples thereof include vinylidene chloride type polymer layer and ethylene vinyl alcohol copolymer layer. Vinylidene chloride type polymer layer is particularly preferred from the points that the barrier property against moisture and/or oxygen is high, the barrier property of oxygen is difficult to be influenced by moisture, and it is inexpensive. The vinylidene chloride type polymer is one containing at least 50% by weight of vinylidene chloride monomer in the polymer composition, and in order to meet the physical property such as a barrier property or heat seal property to the purpose of use, at least one kind selected from vinyl chloride monomer, vinyl acetate monomer, (meth)acrylonitrile, (meth)acrylic acid or those esters, and styrene may be contained as a copolymerizable component in an amount of 0–50% by weight. The vinylidene chloride type polymer is commercially available in the form of emulsion, the form of being dissolved in an organic solvent, and the form of a film or solid. The thickness of the functional layer of type 1 is about 0.1–100 $\mu$m, and preferably about 1–20 $\mu$m.

As the thermoplastic resin layer of type 2, one which is used as the substrate layer of type 1, and the laminate film of type 1 are exemplified.

A method of producing the laminate film includes a method of laminating a thermoplastic resin film and a thermoplastic resin film through an adhesive layer (layer having adhesive property), and a method of forming a primer layer (a layer having adhesive property), and coating or extrusion casting a thermoplastic resin composition thereon. In the case of the laminate film of type 1, the latter method is preferable, and it is preferable to form the primer layer on the thermoplastic resin film which becomes the substrate layer, and coating the thermoplastic resin composition which becomes the functional layer thereon. In particular, where vinylidene chloride type polymer layer is used as the functional layer, it is preferred to coat in the form of an emulsion. In the case of the laminate film of type 2, either method can be used.

The laminate film of the present invention is such that the form of laminating two thermoplastic resin layers is the minimum constituent unit, and depending on the purpose of use, a thermoplastic resin, aluminum or paper is further laminated to form a laminate layer comprising three or more layers. Further, printing may be applied between the laminate or to the surface of the laminate.

The laminate film of the present invention is useful as a packaging film for foods. For example, a laminate film of KOPP/PE/CPP or OPP/PE/Al/PE is useful for snack candies, a film of KOPP/PE or KPET/PE/EVA is useful for water foods such as pickled vegetables, or bean paste, a film of KOPP/CPP is useful for dried foods, and a film of KON/PE/EVA is useful for liquid soup. However, the laminate film is not limited to those, and the laminate films having various combinations can be provided. Herein, OPP: stretched polypropylene film, CPP: unstretched polypropylene film, PE: coating or film of polyethylene, PET: coating or film of polyethylene terephthalate, ON: stretched nylon film, EVA: coating or film of ethylene vinyl alcohol copolymer, K before OPP, PET and ON: OPP, PET and ON is coated with the vinylidene chloride type polymer layer, Al: aluminum layer. In case of laminating vinylidene chloride type polymer layer coating products (K coat product), it is better to be the vinylidene chloride type polymer layer side being inside, If it is outside, the vinylidene chloride type polymer may melt during production of a bag, and the surface becomes uneven, or the vinylidene chloride type polymer may be adhered to a solar.

The characteristic of the present invention is to use the composition which centers the aforementioned curable resin composition of the present invention, namely, to use a cured product of above-mentioned curable adhesive composition containing a polymer having primary and/or secondary amino groups and carboxyl group in one molecule, and a polyvalent oxazoline compound, as a layer for imparting adhesive property between thermoplastic resin layers of the above-mentioned laminate film. In particular, a large effect is obtained in case of using it as a primer layer in coating a layer of the vinylidene chloride type polymer on polyolefin film, polyamide film or polyester film. Furthermore, a large effect is obtained in case of using it as a primer layer in coating a layer of the vinylidene chloride type polymer on stretched polypropylene film. The thickness of such adhesive layer is about 0.05–20 $\mu$m, and preferably 0.1–3 $\mu$m. The heat curing temperature may be about 60–200° C., but in order to retain amino groups and increase the adhesion, it is preferred to be about 150° C. or lower.

Moreover, the polyvalent oxazoline compound in a curable resin composition, used as an adhesive agent of the laminate film, is as follows. Its mixing ratio is the same as that of the oxazoline polymer.

Examples of the polyvalent oxazoline compound (hereinafter sometimes referred to as "compound (B)") include 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline), bis-(2-oxazolinylcyclohexane)sulfide, bis-(2-oxazolinylnorbornane)sulfide. One kind or two or more kinds of those can be used.

As the solvent for the curable adhesive composition of the present invention, conventional solvents can be used. Examples thereof include water; high boiling aromatic solvents such as toluene and xylene; ester type solvents such as ethyl acetate, butyl acetate and cellosolve acetate; alcohol type solvents such as methyl alcohol, ethyl alcohol, n-butyl alcohol, ethylene glycol monoethyl ether, propylene glycol monomethyl ether and isobutyl alcohol; polyvalent alcohol type solvents such as ethylene glycol and propylene glycol; ketone type solvents such as methyl ethyl ketone and methyl isobutyl ketone. One kind or two kinds or more of mixtures selected from those can be used. In particular, the curable adhesive composition of the present invention makes it possible to use an aqueous solvent, thereby being capable of making the composition free from problems such as toxicity or flammability. The aqueous solvent means water containing an organic solvent soluble in water, and for example, water alone, water-ethyl alcohol mixed solvent, water-isopropyl alcohol mixed solvent, and water-propylene glycol monomethyl ether mixed solvent can be used. It is preferable that the content of water in the aqueous solvent is 10% by weight or more.

When the above-mentioned composition is used as a laminate film, crosslinking density, elasticity, and surface tension of an adhesive layer are adjusted by selecting properly kind and quantity of monomers and compounds among a monomer component (a), alkyleneimine (a-3), a basic compound and a monomer component (b) used for preparation of the polymer (A) and the compound (B). Consequently, a curable adhesive composition meeting adhesion, water resistance, durability, and non-discoloration for required capacity of various use of a laminate film, can be obtained and a laminate film having this adhesive layer can be obtained.

Effects and Advantages of the Invention

According to the present invention, there is provided a curable resin composition which can form a coating film excellent in adhesion to various substrate at a low temperature of 150° C. or lower, and can be used safely, without impairing good water resistance and chemical resistance, which are possessed by the conventional curable resin composition containing carboxyl group-containing polymer and oxazoline group-containing polymer.

According to the present invention, a curable adhesive composition having a long pot life, excellent water resistance as well as excellent hot water resistance, and excellent adhesion, and a laminate film using the same can be provided. In particular, large effect is obtained in case of using the above-mentioned curable adhesive composition as a primer layer when coating vinylidene chloride type polymer on a stretched polypropylene film.

DETAILED DESCRIPTION OF THE PREFERRED EMBODIMENTS

The present invention is explained in more detail by showing the following examples of some preferred embodiments, but the invention is in no way limited by these examples. The "parts" show "parts by weight", and "%" shows "% by weight".

REFERENCE EXAMPLE 1

Synthesis of Carboxyl Group-Containing Polymer (A-1), and Synthesis of Carboxyl Group- and Primary and/or Secondary Amino Group-containing Polymer (A)

Two hundred eighty parts of isopropyl alcohol and 126 parts of n-butoxyethanol were charged into a 1 liter flask equipped with a stirrer, a reflux condenser, a thermometer, a nitrogen inlet pipe, and a dropping funnel, and the temperature was raised to 80° C. while introducing nitrogen. A monomer mixture composed of 80.5 parts of methacrylic acid, 63 parts of methyl methacrylate, 136.5 parts of butyl acrylate, 70 parts of styrene, and 9 parts of azobisisobutyronitrile was added dropwise over 2 hours. After completion of the dropwise addition, the mixture was aged at 80° C. for 6 hours, and cooled, and 41.4 parts of triethylamine were added thereto. The mixture was uniformly stirred to obtain a carboxyl group-containing polymer (A-1A) having a non-volatile content of 44.4%. Sixty-one point six parts of an ethyleneimine aqueous solution were added dropwise to the polymer at 40° C. or lower over 30 minutes. After completion of the dropwise addition, the temperature was raised to 80° C., and cooled after reaction for 4 hours. Eighty-four parts of deionized water were added thereto, and uniformly stirred to obtain a polymer (A1) having a non-volatile content of 40.0%. The carboxyl group in this polymer (A1) had an acid value of 89.9 mgKOH/g by titration, and n=1.6.

REFERENCE EXAMPLE 2

Synthesis of Carboxyl Group-Containing Polymer (A-1), and Synthesis of Carboxyl Group- and Primary and/or Secondary Amino Group-Containing Polymer (A)

Three hundred ninety-seven parts of deionized water and 40 parts of 25% anionic surfactant (HI-TENOL 18E, a product of Dai-ichi Kogyo Seiyaku Co., Ltd.) aqueous solution were added to the same flask as in Reference Example 1. The temperature was raised to 70° C. while introducing nitrogen. Forty parts of monomer mixture composed of 48 parts of acrylic acid, 56.8 parts of methyl methacrylate, 157.2 parts of butyl acrylate and 138 parts of styrene was added to the flask, followed by stirring for 15 minutes, and 4.6 parts of 1.75% hydrogen peroxide aqueous solution and 4.2 parts of 3% L-ascorbic acid were added to initiate polymerization. After 15 minutes from the initiation of polymerization, the remaining monomer mixture was added dropwise over 1 hour and 30 minutes. During this period, 41 parts of 1.75% hydrogen peroxide aqueous solution and 37 parts of 3% L-ascorbic acid aqueous solution were added dropwise to the flask over 1 hour and 30 minutes similar to the monomer mixture. After completion of the dropwise addition, it was aged at 70° C. for 2 hours, and then cooled. Thirteen point six parts of 25% aqueous ammonia were added, and uniformly stirred to obtain a carboxyl group-containing polymer (A-1B) having non-volatile content of 43.9%. Two hundred twenty point three parts of 13% ethyleneimine aqueous solution were added to this polymer at 40° C. or lower over 60 minutes. After dropwise addition, the temperature was raised to 50° C., and then cooled after reaction for 4 hours, to obtain a polymer (A2) having an non-volatile content of 38.0%. The carboxyl group of this polymer (A2) had an acid value of 52.2 mgKOH/g by titration, and n=2.5.

REFERENCE EXAMPLE 3

Synthesis of Carboxyl Group- and Primary and/or Secondary Amino Group-Containing Polymer (A) from Carboxyl Group-Containing Polymer (A-1)

Seven hundred parts of commercially available acrylic water-dispersing resin (acid value 50 mgKOH/g, ammonia neutralization, non-volatile content 49%) (A-1C) were charged in the same flask as in Reference Example 1, and 172.9 parts of 3.6% ethyleneimine aqueous solution were added dropwise at 40° C. or lower over 60 minutes. After completion of the dropwise addition, the temperature was raised to 50° C., and then cooled after reaction for 4 hours, to obtain a polymer (A3) having a non-volatile content of 40.0%. The carboxyl group of this polymer (A3) had an acid value of 23.1 mgKOH/g by titration, and n=1.5.

REFERENCE EXAMPLE 4

Preparation of Carboxyl Group-Containing Polymer (A-1), and Synthesis of Carboxyl Group- and Primary and/or Secondary Amino Group-Containing Polymer (A)

Three hundred parts of commercially available acryl-styrene resin (acid value 235 mgKOH/g), 60 parts of iso-propyl alcohol, 332.2 g of deionized water, and 71.3 parts of 25% aqueous ammonia were charged in the same flask as in Reference Example 1. The temperature was raised to 80° C. to dissolve, thereby obtaining a carboxyl group-containing polymer (A-1D) having a non-volatile content of 39.3%. After uniformly dissolving, it was cooled, and 9 parts of ethyleneimine were added dropwise at 40° C. or lower over 30 minutes. After completion of the dropwise addition, the temperature was raised to 80° C., and then cooled after reaction for 4 hours to obtain a polymer (A4) having a non-volatile content of 40.0%. The carboxyl group of this polymer (A4) had an acid value of 182.6 mgKOH/g by titration, and n=1.5.

COMPARATIVE REFERENCE EXAMPLE 1

Synthesis of Carboxyl Group- and Tertiary Amino Group-Containing Polymer

Two hundred eighty parts of isopropyl alcohol and 126 parts of N-butoxyethanol were charged in the same flask as in Reference Example 1, and the temperature was then raised to 80° C. while introducing nitrogen. A monomer mixture composed of 76.4 parts of triethylamine-methacrylate naturalization product obtained by adding 41.4 parts of triethylamine to 35 parts of methacrylic acid under cooling and neutralizing, 63 parts of methyl methacrylate, 136.5 parts of butyl acrylate, 70 parts of styrene, 45.5 parts of dimethylaminoethyl methacrylate, and 9 parts of azobi-sisobutyronitrile was added dropwise over 2 hours. After completion of the dropwise addition, it was aged at 80° C. for 6 hours, and then cooled to obtain a carboxyl group- and tertiary amino group-containing polymer (A1') having a non-volatile content of 44.4%.

REFERENCE EXAMPLE 5

Synthesis of Oxazoline Group-Containing Polymer (B)

Five hundred forty-seven parts of deionized water and 48 parts of 25% anionic surfactant (HI-TENOL N-08, a product of Dai-ichi Kogyo Seiyaku Co., Ltd.) aqueous solution were charged into the same flask as in Reference Example 1, and after adjusting pH to 9.0 with an appropriate amount of 25% aqueous ammonia, the temperature was raised to 70° C. while introducing nitrogen. After adding 40 parts of 5% aqueous solution of potassium persulfate, a monomer mixture composed of 208 parts of butyl acrylate, 112 parts of styrene and 80 parts of 2-isopropenyl-2-oxazoline were added dropwise over 3 hours. After completion of the dropwise addition, the temperature was raised to 80° C., followed by aging for 2 hours and then cooled. After cooling, the pH was adjusted to 8.0 with an appropriate amount of 25% aqueous ammonia to obtain an oxazoline group-containing polymer (B-1) having a non-volatile content of 40.0%.

REFERENCE EXAMPLE 6

Synthesis of Oxazoline Group-Containing Polymer (B)

Four hundred parts of isopropyl alcohol were charged into the same flask as in Reference Example 1, and the temperature was raised to 60° C while introducing nitrogen. After adding 200 parts of 10% aqueous solution of 2,2'-azobis(2-amidinopropane) dihydrochloride, a monomer mixture composed of 80 parts of ethyl acrylate, 120 parts of methyl methacrylate and 200 parts of 2-isopropenyl-2-oxazoline was added dropwise over 3 hours. After completion of the dropwise addition, the inner temperature was raised to 70° C., followed by aging for 3 hours and then cooled. After cooling, pH was adjusted to 8.0 with an appropriate amount of 25% aqueous ammonia to obtain an oxazoline group-Containing polymer (B-2) having a non-volatile content of 40.0%.

EXAMPLES 1–8 AND COMPARATIVE EXAMPLES 1–9

Using the carboxyl group-containing polymer (A-1), the carboxyl group- and primary and/or secondary amino group-containing polymer (A) and the oxazoline group-containing polymer (B), curable resin compositions were prepared with the blending compositions shown in Table 1.

Those compositions were evaluated with the methods mentioned below. The evaluation results are also shown in Table 1. Incidentally, the drying conditions are all at 120° C. for 30 minutes.

Adhesion 1: A composition was coated on a corona discharge-treated OPP film and PET film with No.5 bar coater, and dried under heating. After cooling, a pressure-sensitive adhesive tape was adhered on the coating film, and a forced peeling was conducted.

◎: No peeling, : Slightly peeled, Δ: Partially peeled, ×: Peeled.

Adhesion 2: A composition was coated on a glass plate, a steel plate, and a PS (polystyrene) film with a No.28 bar coater, and then dried under heating. After cooling, 100 of 1 mm square cross-cuts were formed with a cutter knife and a guide. After adhering a pressure-sensitive adhesive tape on the cross-cuts, a forced peeling was performed. The number of cross-cuts remained on the substrate without peeling was measured. In addition, the same adhesion test as the above-mentioned one was carried out to surfaces of molded matters, as substrates, of thermoplastic plastics such as plate-shaped polystyrene and modified polystyrene which was obtained by partially modifying the polystyrene with maleimide-styrene copolymers. As a result, the adhesion was good similarly to the results of the test to the above-mentioned various substrates. The composition of the above-mentioned, maleimide-modified polystyrene is not especially limited. For example, the tested matter was a modified product of polystyrene with an N-cyclohexylmaleimide-styrene copolymer, wherein the weight ratio of the polystyrene to the N-cyclohexylmaleimide-styrene copolymer was 60/40, and further, as to the composition of the N-cyclohexylmaleimide-styrene copolymer, the weight ratio of N-cydohexylmaleimide to styrene was 20/80. These molded matters can be obtained by molding plate-shaped, molded articles of 2 mm in thickness using conventional injection molding apparatuses.

Solvent resistance: After forming a coating film on a glass plate in the same manner as in the above-mentioned adhesion 2, rubbing was conducted 50 times with absorbent cotton impregnated with methyl ethyl ketone, and the state of the coating film was observed.

◎: No change, : Slightly scratched, Δ: Change such as matting, ×: Breakage or dissolution of coating film.

Water resistance: After forming the coating film on a glass plate in the same manner as in the above-mentioned adhesion 2, a glass column was stood on the coating film, deionized water was introduced thereinto, and water-resistant spot test was conducted at normal temperature for 16 hours.

◎: No change, : Slightly fluorescent, Δ: Change such as whitening or blister, ×: Breakage or dissolution of coating film.

Storage stability: A composition was stored in a thermostatic chamber at 50° C. for 3 days, and change of the composition was observed.

◎: No change, : Slight viscosity increase, Δ: Viscosity increase, ×: Gelled.

TABLE 1

| | Example | | | | | | | | Comparative Example | | | | | | | | |
|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 9 |
| Polymer(A-1): parts | | | | | | | | | | | | | | | | | |
| A-1A | | | | | | | | | 100 | | | | | | | | |
| A-1B | | | | | | | | | | 100 | 100 | | | | | 100 | |
| A-1C | | | | | | | | | | | | 100 | | | | | |
| A-1D | | | | | | | | | | | | | 100 | | | | |
| Polymer (A): parts | | | | | | | | | | | | | | | | | |
| A1 | 100 | | | | | | | | | | | | | | | | |
| A2 | | 100 | 100 | 100 | | | | | | | | | | | 100 | | 100 |
| A3 | | | | | 100 | | | | | | | | | | | | |
| A4 | | | | | | 100 | 100 | 100 | | | | | | | | | |
| A1' | | | | | | | | | | | | | | 100 | | | |
| Polymer (B): parts | | | | | | | | | | | | | | | | | |
| B-1 | | 20 | | | | 90 | | | | 50 | | | | | | | |
| B-2 | 10 | | 10 | 15 | 5 | | 40 | 70 | 30 | | 20 | 10 | 30 | 10 | | | |
| EM-85¹: parts | | | | | | | | | | | | | | | 15 | | |
| Deionized water: parts | | | | | | | | | 11 | 10 | 10 | 20 | | | 10 | 10 | |
| Non-volatile content (%) | 40.0 | 38.3 | 38.2 | 38.3 | 40.0 | 40.0 | 40.0 | 40.0 | 40.0 | 39.9 | 39.9 | 40.8 | 39.5 | 40.0 | 40.0 | 40.4 | 38.0 |
| Adhesion 1 | | | | | | | | | | | | | | | | | |
| OPP | ◎ | ◎ | ◎ | ◎ | ◎ | ◎ | ◎ | ◎ | ○ | × | × | Δ | ◎ | × | ◎ | × | ◎ |
| PET | ◎ | ◎ | ◎ | ◎ | ◎ | ◎ | ◎ | ○ | ◎ | × | Δ | ◎ | ◎ | Δ | Δ | ◎ | × | ○ |

TABLE 1-continued

| | Example | | | | | | | | Comparative Example | | | | | | | | |
|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 9 |
| Adhesion 2 | | | | | | | | | | | | | | | | | |
| Glass | 100 | 100 | 100 | 100 | 100 | 100 | 100 | 100 | 100 | 100 | 100 | 100 | 80 | 100 | 100 | 100 | 100 |
| Iron | 100 | 100 | 100 | 100 | 100 | 100 | 100 | 100 | 100 | 100 | 100 | 100 | 100 | 100 | 100 | 100 | 100 |
| PS | 100 | 100 | 100 | 100 | 100 | 100 | 100 | 100 | 0 | 100 | 100 | 100 | 75 | 100 | 100 | 100 | 100 |
| Molded matter of PS[2] | 100 | 100 | 100 | 100 | 100 | 100 | 100 | 100 | 0 | 100 | 100 | 100 | 75 | 100 | 100 | 100 | 100 |
| Molded matter of modified PS[3] | 100 | 100 | 100 | 100 | 100 | 100 | 100 | 100 | 0 | 100 | 100 | 100 | 75 | 100 | 100 | 100 | 100 |
| Solvent resistance | ⊚ | ⊚ | ⊚ | ⊚ | ⊚ | ⊚ | ⊚ | ⊚ | ⊚ | ⊚ | ⊚ | ⊚ | ⊚ | x | ⊚ | x | x |
| Water resistance | ⊚ | ⊚ | ⊚ | ⊚ | ○ | ⊚ | ⊚ | ⊚ | ⊚ | ⊚ | ⊚ | ○ | ○ | x | ⊚ | Δ | ⊚ |
| Storage stability | ○ | ⊚ | ⊚ | ○ | ⊚ | ⊚ | ⊚ | ○ | ○ | ⊚ | ⊚ | ⊚ | ○ | ⊚ | x | ⊚ | ⊚ |

[1]80% Epiclon EM 85 (bisphenol A type epoxy, a product of Yuka-Sheil Epoxy K. K.) dispersion
[2]Molded matter of of only polystyrene
[3]Molded matter of a modified product of polystyrene with an N-cyclohexylmaleimide-styrene copolymer Then, Examples and Comparative Examples of laminate films are explained. In this case, polymers obtained by undermentioned Comparative Reference Example 2 as well as foregoing Reference Example 1 to 6 and Comparative Reference Example 1, were used.

COMPARATIVE REFERENCE EXAMPLE 2

Synthesis of Acid-Neutralized Primary and/or Secondary Amino Group-containing Polymer Three hundred parts of propylene glycol monomethyl ether were charged into the same flask as in Reference Example 1, and the temperature was raised to 80° C. while introducing nitrogen. A monomer mixture composed of 70 parts of methacrylic acid, 60 parts of methyl methacrylate, 110 parts of butyl acrylate, 60 parts of styrene and 12 parts of azoisobutyronitrile was added dropwise over 3 hours. After completion of the dropwise addition, it was aged at 80° C. for 6 hours, and then cooled to obtain a carboxyl group-containing polymer (A-1E) having a non-volatile content of 50%. An acid value of this polymer was 114 mgKOH/g by titration. Sixty parts of ethyleneimine were added dropwise to this polymer at 40° C. or lower over 30 minutes. After completion of the dropwise addition, the temperature was raised to 80° C., and cooled after reaction for 5 hours, and 116 parts of 35% hydrochloric acid were added to obtain an acid-neutralized primary and/or secondary amino group-containing polymer (A1") having a non-volatile content of 46%.

The carboxyl groups of the polymer prior to acid neutralization of this polymer (A1") was 1 mgKOH/g or less by titration, and almost no carboxyl group remained. Further, n was calculated from a gas chromatography of residual ethyleneimine and the residual amount of carboxyl group measured by titration at this time, and was found to be 1.6.

A polypropylene film (PYRENE P2761, a product of Toyobo Co., Ltd. film thickness: 60 μm) was used as the thermoplastic film, each adhesive composition was coated with a bar coater at a coating thickness of 0.4 μm, the coating was dried in a hot air drier adjusted to 100° C. for 30 seconds, and then a vinylidene chloride type emulsion (SLANTEX L513, a product of Asahi Chemical Industry Co., Ltd.) which had previously adjusted with 25 wt % aqueous ammonia such that pH was 9 and a solid content was 30% by weight, was coated with a bar coater at a coating thickness of 3 μm. The coating was dried in a hot air drier adjusted to 100° C. for 1 minute to adjust each test piece, the test piece was further aged at 50° C. for 2 days, and evaluation was made on adhesive property, hot water adhesive property, and hot water discoloration mentioned below.

Results are shown in Table 2 below.

Pot Life of Adjusted Primer Mixed Liquid

An adjusted primer mixed liquid (provided that 10 wt % isopropyl alcohol diluting ratio was changed, and the solid content was 40% by weight) was sealed in a can bottle and stored at 50° C. Time until gelation on appearance was measured.

Within 24 hours: x
24–72 hours: Δ
More than 72 hours: o

Adhesive Property

Adhesive property between polypropylene film layer and vinylidene chloride type polymer layer in a test piece was measured with a tensile tester in terms of T-type peel strength (g/25 mm).

Hot Water Adhesive Property

A test piece was dipped in hot water of 95° C. for 90 minutes, and the same T-type peel strength (g/25 mm) of the test piece taken out therefrom were measured as well as the adhesive property mentioned above.

Hot Water Discoloration

Determined with appearance after the hot water test.

TABLE 2

| | Example | | | | | | | | Comparative Example | | | | | | | | | |
|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 9 | 10 |

Polymer (A-1): parts

TABLE 2-continued

|  | Example | | | | | | | | Comparative Example | | | | | | | | | |
|---|---|---|---|---|---|---|---|---|---|---|---|---|---|---|---|---|---|---|
|  | 1 | 2 | 3 | 4 | 5 | 6 | 7 | 8 | 1 | 2 | 3 | 4 | 5 | 6 | 7 | 8 | 9 | 10 |
| A-1A |  |  |  |  |  |  |  |  | 20 |  |  |  |  |  |  |  |  |  |
| A-1B |  |  |  |  |  |  |  |  |  | 20 | 20 |  |  |  |  |  | 20 |  |
| A-1C |  |  |  |  |  |  |  |  |  |  |  | 20 |  |  |  |  |  |  |
| Polymer (A): parts |  |  |  |  |  |  |  |  |  |  |  |  |  |  |  |  |  |  |
| A1 | 20 | 20 |  |  |  |  |  |  |  |  |  |  | 20 |  |  |  |  |  |
| A2 |  |  | 20 | 20 | 20 | 20 |  |  |  |  |  |  |  | 20 |  |  |  | 20 |
| A3 |  |  |  |  |  |  | 20 | 20 |  |  |  |  |  |  |  |  |  |  |
| A1' |  |  |  |  |  |  |  |  |  |  |  |  |  |  | 20 |  |  |  |
| A1" |  |  |  |  |  |  |  |  |  |  |  |  |  |  |  | 20 |  |  |
| Polymer (B): parts |  |  |  |  |  |  |  |  |  |  |  |  |  |  |  |  |  |  |
| B-1 | 2.5 |  | 1.25 | 2.5 | 5 |  | 2.5 |  | 3.0 | 2.8 |  | 2.8 |  |  |  |  |  |  |
| B-2 |  | 1.0 |  |  |  | 1.0 |  | 1.0 |  |  | 1.1 |  |  |  | 1.0 |  |  |  |
| EX-313*: parts |  |  |  |  |  |  |  |  |  |  |  |  | 1.7 | 1.6 |  | 6.3 |  |  |
| 10% isopropyl alcohol aqueous solution: parts | 128 | 119 | 114 | 121 | 135 | 112 | 128 | 119 | 145 | 142 | 133 | 159 | 140 | 132 | 134 | 232 | 126 | 107 |
| Adhesive property | MB | MB | MB | MB | MB | MB | MB | MB | 100 | 120 | 110 | 120 | MB | MB | 70 | MB | 80 | 200 |
| Not water adhesive property | 180 | 170 | 140 | 180 | 200 | 170 | 170 | 150 | 50 | 60 | 40 | 50 | 170 | 180 | 20 | 150 | 20 | 80 |
| Not water discoloration | None | None | None | None | None | None | None | None | None | None | None | None | None | None | None | Discolored | None | None |
| Pot life | ○ | ○ | ○ | ○ | ○ | ○ | ○ | ○ | ○ | ○ | ○ | ○ | x | Δ | ○ | x | ○ | ○ |

*Water-soluble epoxy resin, DENACOAL EX313, a product of Nagase Kasei Co.
MB: Material breakage Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A curable resin composition comprising a carboxyl group-containing polymer and an oxazoline group-containing polymer, characterized in that the carboxyl group containing polymer comprises a primary and/or secondary amino group.

2. The curable resin composition as claimed in claim 1, wherein the primary and/or secondary amino group is represented by the following general formula (I):

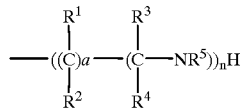

(wherein $R^1$, $R^2$, $R^3$, $R^4$ and $R^5$ each represent hydrogen, halogen, alkyl, aralkyl, aryl group, or cyano-, halo- amino-, hydroxy-, alkoxy- or carboalkoxy-substituted alkyl, aralkyl or aryl group, a is 0 or 1, and n is 1 or more).

3. The curable resin composition as claimed in claim 1, wherein the carboxyl group-containing polymer comprising the primary and/or secondary amino group is one obtained by converting some carboxyl groups of the carboxyl group-containing polymer into primary and/or secondary amino groups with alkyleneimine.

4. The curable resin composition as claimed in claim 1, characterized by further comprising a basic compound.

5. A curable adhesive composition which is used as an adhesive layer of a laminate film in which a first thermoplastic resin layer and a second thermoplastic resin layer are laminated by the adhesive layer, characterized in that the composition comprises a polymer having a primary and/or secondary amino group and a carboxyl group in one molecule, and a polyvalent oxazoline compound.

6. The curable adhesive composition as claimed in claim 5, wherein the first thermoplastic resin layer and/or the second thermoplastic resin layer are polyolefin film, polyamide film or polyester film.

7. A curable adhesive composition which is used as an adhesive layer of a laminate film in which a functional layer comprising a thermoplastic resin layer having a barrier property against moisture and/or oxygen is laminated on a substrate layer comprising a thermoplastic resin layer by the adhesive layer, characterized in that the composition comprises a polymer having a primary and/or secondary amino group and a carboxyl group in one molecule, and a polyvalent oxazoline compound.

8. The curable adhesive composition as claimed in claim 7, wherein the thermoplastic resin layer as the functional layer is a vinylidene chloride polymer layer.

9. A laminate film in which a first thermoplastic resin layer and a second thermoplastic resin layer are laminated by an adhesive layer, characterized in that a curable adhesive composition comprising a polymer having a primary and/or secondary amino group and a carboxyl group in one molecule and a polyvalent oxazoline compound, is used as the adhesive layer.

10. A laminate film in which a functional layer comprising a thermoplastic resin layer having a barrier property against moisture and/or oxygen is laminated on a substrate layer comprising a thermoplastic resin layer by the adhesive layer, characterized in that a curable adhesive composition comprising a polymer having a primary and/or secondary amino group and a carboxyl group in one molecule and a polyvalent oxazoline compound, is used as the adhesive layer.

11. The curable resin composition as claimed in claim 2, wherein the carboxyl group-containing polymer containing primary and/or secondary amino groups is one obtained by modifying a part of carboxyl group of the carboxyl group-containing polymer into primary and/or secondary amino groups with alkyleneimine.

12. The curable resin composition as claimed in claim 2, characterized by further comprising a basic compound.

13. The curable resin composition as claimed in claim 3, characterized by further comprising a basic compound.

14. The curable resin composition as claimed in claim 11, characterized by further comprising a basic compound.

15. The curable resin composition as claimed in claim 3, wherein the carboxyl group-containing polymer is obtained by polymerizing a monomer component containing at least one unsaturated carboxylic acid, and wherein the carboxyl group is present in an amount of 1% by weight or more based on the amount of the unsaturated carboxylic acid in the carboxyl group-containing polymer.

16. The curable resin composition as claimed in claim 11, wherein the carboxyl group-containing polymer is obtained by polymerizing a monomer component containing at least one unsaturated carboxylic acid, and wherein the carboxyl group is present in an amount of 1% by weight or more based on the amount of the unsaturated carboxylic acid in the carboxyl group-containing polymer.

17. The curable resin composition as claimed in claim 13, wherein the carboxyl group-containing polymer is obtained by polymerizing a monomer component containing at least one unsaturated carboxylic acid, and wherein the carboxyl group is present in an amount of 1% by weight or more based on the amount of the unsaturated carboxylic acid in the carboxyl group-containing polymer.

* * * * *